United States Patent [19]

Watanabe

[11] Patent Number: 5,489,243
[45] Date of Patent: Feb. 6, 1996

[54] TIMING BELT TENSIONER FOR AN ENGINE

[75] Inventor: Takahide Watanabe, Hamamatsu, Japan

[73] Assignee: Sanshin Kogyo Kabushiki Kaisha, Hamamatsu, Japan

[21] Appl. No.: 302,188

[22] Filed: Sep. 8, 1994

[30] Foreign Application Priority Data

Sep. 8, 1993 [JP] Japan .................. 5-223746

[51] Int. Cl.⁶ .................................................. F16H 7/12
[52] U.S. Cl. ................ 474/135; 440/900; 123/90.31; 123/192.2; 74/15.88
[58] Field of Search ........................ 474/101, 133, 474/135; 74/15.88, 573 R; 123/90.31, 192.1, 192.2; 440/900

[56] References Cited

U.S. PATENT DOCUMENTS

| | | | |
|---|---|---|---|
| 5,154,144 | 10/1992 | Okui et al. | 123/90.27 |
| 5,370,563 | 12/1994 | Yamazaki et al. | 440/900 X |
| 5,375,578 | 12/1994 | Kato et al. | 123/516 |
| 5,400,748 | 3/1995 | Batzill et al. | 123/90.31 |

*Primary Examiner*—Roger J. Schoeppel
*Attorney, Agent, or Firm*—Knobbe, Martens, Olson & Bear

[57] ABSTRACT

A drive arrangement for the camshaft of an internal combustion engine employed in an outboard motor that includes a pivoted idler pulley that is disposed within the outer periphery of the flywheel but which has a portion extending beyond the flywheel for adjustment without removing the flywheel.

10 Claims, 4 Drawing Sheets

TIMING BELT TENSIONER FOR AN ENGINE

BACKGROUND OF THE INVENTION

This invention relates to a timing belt tensioner for an engine, and more particularly to an improved, simplified, and more easily adjustable timing belt tensioner for an engine.

In internal combustion engines, and particularly those operating on a four-cycle principle, it is the practice to drive the camshaft or camshafts of the engine by means of a timing drive mechanism. Frequently, either timing belts or timing chains, hereinafter referred to collectively as "flexible transmitters," are normally employed for this purpose. Where flexible transmitters are employed for driving a camshaft from an engine crankshaft, however, it is necessary to provide some mechanism for adjusting the tension on the flexible transmitter. This is because the transmitters tend to elongate with time, and unless the appropriate tension is maintained on the transmitter, the driving relationship between the transmitter, the crankshaft, and the camshaft can become disturbed.

It is normally the practice to employ an idler pulley that is engaged with the flexible transmitter and which is adjustably supported for achieving the tensioning adjustment. Normally, this idle tensioner pulley is positioned close to the driving sprocket on the crankshaft. The reason for this is to ensure that the flexible transmitter be it a chain or a toothed belt is maintained in engagement with a substantial portion of the driving sprocket.

This gives rise to certain problems in conjunction with the periodic adjustment of the tensioner. These problems are particularly acute when the mechanism is employed as a power plant in an outboard motor. Normally, in outboard motor applications and also in many other applications for engines, there is attached to the crankshaft a flywheel which is disposed outwardly of the driving sprocket for the camshaft drive. As a result, the tensioner pulley will be positioned within the peripheral edge of the flywheel, and thus it may be necessary to remove the flywheel in order to provide access to the adjustment mechanism of the tensioner. Obviously, this is a time-consuming and cumbersome task.

It is, therefore, a principal object of this invention to provide an improved tensioner arrangement for the camshaft drive of an internal combustion engine.

It is a further object of this invention to provide an improved tensioner arrangement for the flexible transmitter of a camshaft drive wherein the tensioner pulley is positioned within the outer peripheral edges of the flywheel, but its adjustment can be affected without removal of the flywheel.

SUMMARY OF THE INVENTION

This invention is adapted to be embodied in a tensioner arrangement for the flexible transmitter of the camshaft drive of an internal combustion engine having an engine output shaft, a flywheel attached to the engine output shaft, and a drive sprocket attached to the engine output shaft between the body of the engine and the flywheel. A camshaft is positioned remotely from the engine output shaft and has a sprocket affixed to one end thereof. A flexible transmitter is engaged with the camshaft sprocket and the engine output shaft sprocket for driving the camshaft from the engine output shaft in timed relationship. A tensioner pulley is engaged with the flexible transmitter adjacent the engine output shaft and within the peripheral confines of said flywheel. A means is provided for adjusting the position of said tensioner pulley that is disposed radially outwardly of the outer peripheral edge of the flywheel.

DETAILED DESCRIPTION OF THE PREFERRED EMBODIMENT OF THE INVENTION

Figure 1:
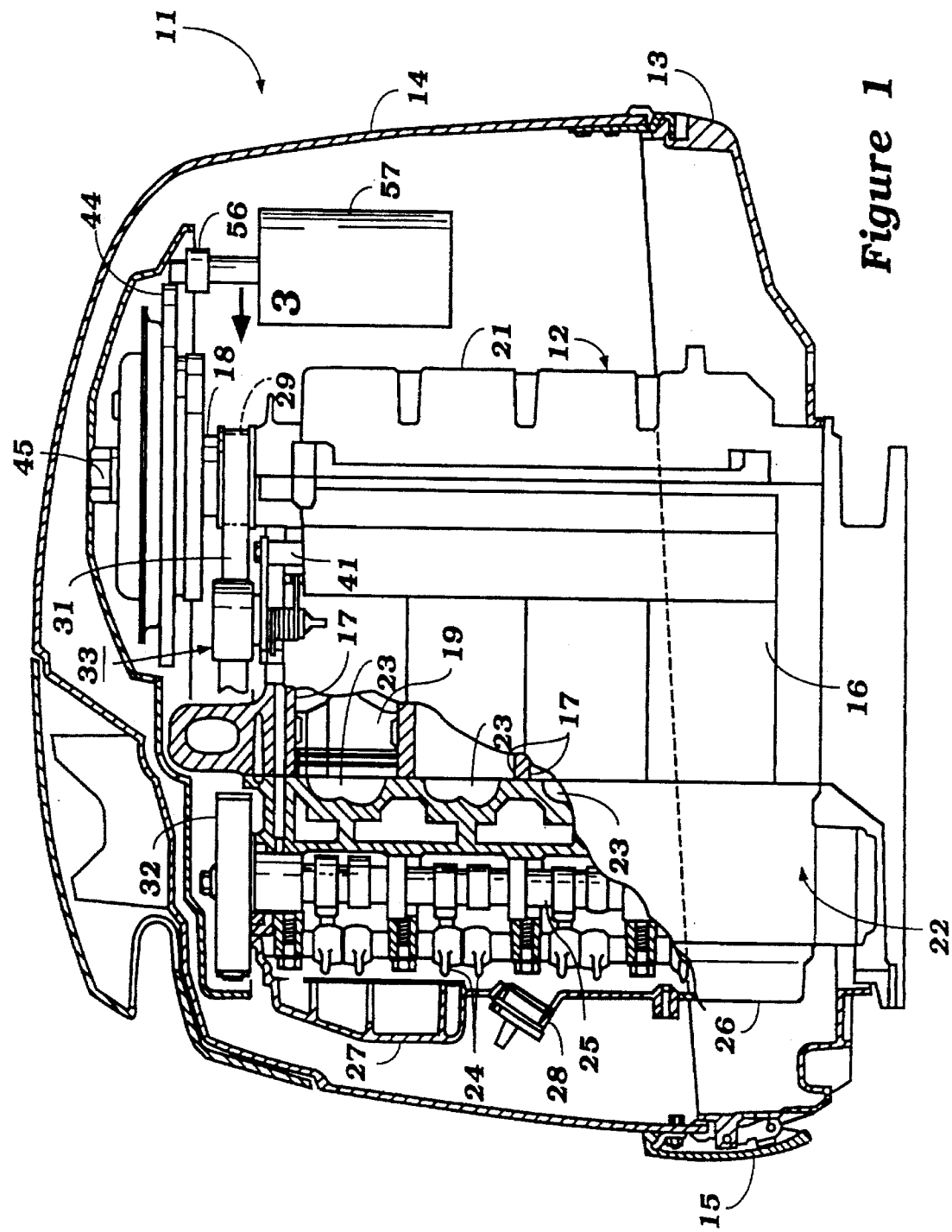
FIG. 1 is a side elevational view of the power head of an outboard motor, with a portion broken away so as to more clearly show the construction.

Referring now in detail to the drawings and initially to FIG. 1, an outboard motor constructed and operated in accordance with an embodiment of the invention is identified generally by the reference numeral 11. The invention is described in conjunction with an outboard motor because the invention has particular utility in conjunction with such motors. As will become apparent to those skilled in the art from the following description, however, the invention may also be utilized in other applications than outboard motors.

The invention is directed primarily to the internal combustion engine, indicated generally by the reference numeral 12, which forms the power plant of the outboard motor, and for that reason only the actual power head which contains the internal combustion engine 12 is illustrated in detail. This power head is completed by a protective cowling that is comprised of a lower tray portion 13 above which the engine 12 is positioned, and a main cowling portion 14 that is detachably connected to the tray 13 by means that include a releasable latch assembly 15.

In the illustrated embodiment, the engine 12 is of the in-line four-cylinder type operating on a four cycle principle, although it will be readily apparent to those skilled in the art how the invention may be employed with engines of other cylinder numbers and other configurations.

The engine 12 includes a cylinder block 16, which is formed with four cylinder bores 17 (only three of which appear in FIG. 1 and which have their axes aligned in a vertical plane). The engine 12 is disposed, as is typical with outboard motor practice, so that its output shaft, a crankshaft 18, is rotatable about a vertically disposed axis. Pistons 19 are slidably supported in the cylinder bores 17 and are connected by means of connecting rods (not shown) to the crankshaft 18 for driving it. The crankshaft 18 is rotatably journaled in a known manner within a crankcase chamber formed at the base of the cylinder block and in part by a crankcase member 21 that is affixed to the cylinder block 16 in a well-known manner.

It should be noted that the invention deals primarily with the camshaft driving mechanism, to be described, and for that reason the internal details of the engine 12 are not necessary to understand the construction and operation of the invention. However, certain components of the engine 12 will be shown in some detail so as to permit understanding of the invention and its orientation to the details of the engine. However, where any engine detail is not described, it may be considered to be conventional.

A cylinder head assembly, indicated generally by the reference numeral 22, is affixed to the cylinder block 16 at the end opposite the crankcase member 21. The cylinder head 22 is provided with a plurality of individual recesses 23, which cooperate with the pistons 19 and cylinder bore 17 to form the combustion chambers of the engine.

An exhaust system and an induction system, which may be of any known type, are provided for exhausting the gases from the combustion chambers 23 and for introducing a fuel-air mixture to the combustion chambers 23. This induction and exhaust system includes intake and exhaust valves (not shown) that are mounted in the cylinder head assembly 22 in a well-known manner and which are operated through rocker arms 24 from a single overhead-mounted camshaft 25, which is journaled in the cylinder head 22 in any well-known manner. The camshaft 25 and rocker arms 24 are contained within a valve cover 26 that is affixed to the cylinder head 22 in a known manner. The cam cover 26 is provided with an oil separator 27 for the crankcase ventilation and a fill cap 28 through which lubricant may be added to the engine in a well-known manner.

The drive for the camshaft 25 will now be described by particular reference to the remaining figures, in addition to FIG. 1. This includes a driving sprocket 29 that is affixed to the crankshaft 18 at a point above the upper end walls of the crankcase member 21 and the cylinder block 16. The driving sprocket 29 is engaged with a toothed belt 31 which, in turn, drives a toothed sprocket 32 that is affixed to the upper end of the camshaft 25 at an area above the upper face of the cylinder head 22. The belt 31 is thus exposed, as is typical with camshaft drive belts. It should be readily apparent, however, that the invention can be also employed with a chain type of drive for the camshaft, since both belts and chains have the common feature that they require tension adjustment mechanisms.

A combined idler puller, tension adjuster, indicated generally by the reference numeral 33, is provided for maintaining the initial adjustment on the timing belt 31 and also for adjusting the tension as the timing belt 31 elongates with time. As will be noted, it is desirable to maintain this tensioner idler puller as close as possible to the axis of rotation of the crankshaft 18 so as to ensure maximum contact between the drive belt 31 and the driving sprocket 29, and FIGS. 2 and 5–7 clearly show how this relationship is established.

The idler, tensioner assembly 33 includes a mounting plate 34 having an upstanding central post 35 on which the actual pulley element 36 is supported by means of an anti-friction bearing 37. The tensioner pulley 36 has a generally smooth outer surface, since it is operative with a drive belt and engages the back or non-toothed side of the belt 31.

The upper end of the pulley 36 is formed with a central opening 38 which is closed by means of a cover plate 39 so as to permit replacement of the pulley 36 if required.

For adjustment and tensioning purposes, the plate 34 is pivotably mounted on the upper face of the cylinder block 16 and specifically on a raised boss 41 thereof by means of a pivot bolt 42. The pivot bolt 42 is formed with a shouldered portion 43 so as to hold the plate 34 in a generally fixed direction relative to the axis of the pivot bolt 42, but also so as to permit the plate 34 to rotate for adjustment purposes.

It should be noted that a flywheel magneto assembly, indicated generally by the reference numeral 44, is also affixed to the crankshaft 18 above the drive pulley 29 by means of a nut 45 threaded onto the end of the crankshaft 18. The flywheel 44 has an outer peripheral edge, which is shown in phantom in FIG. 2 and which, it will be seen, overlies the idler tensioner pulley 36. This is a result of the desire to maintain the axis of rotation of the pulley 36 as close to the axis of rotation of the crankshaft 18 as possible. Hence, with prior art types of constructions, it has been difficult to adjust the idler pulley 36, and in fact, in some instances it is necessary to remove the flywheel magneto 44 before the drive belt tension can be adjusted.

Figure 2:
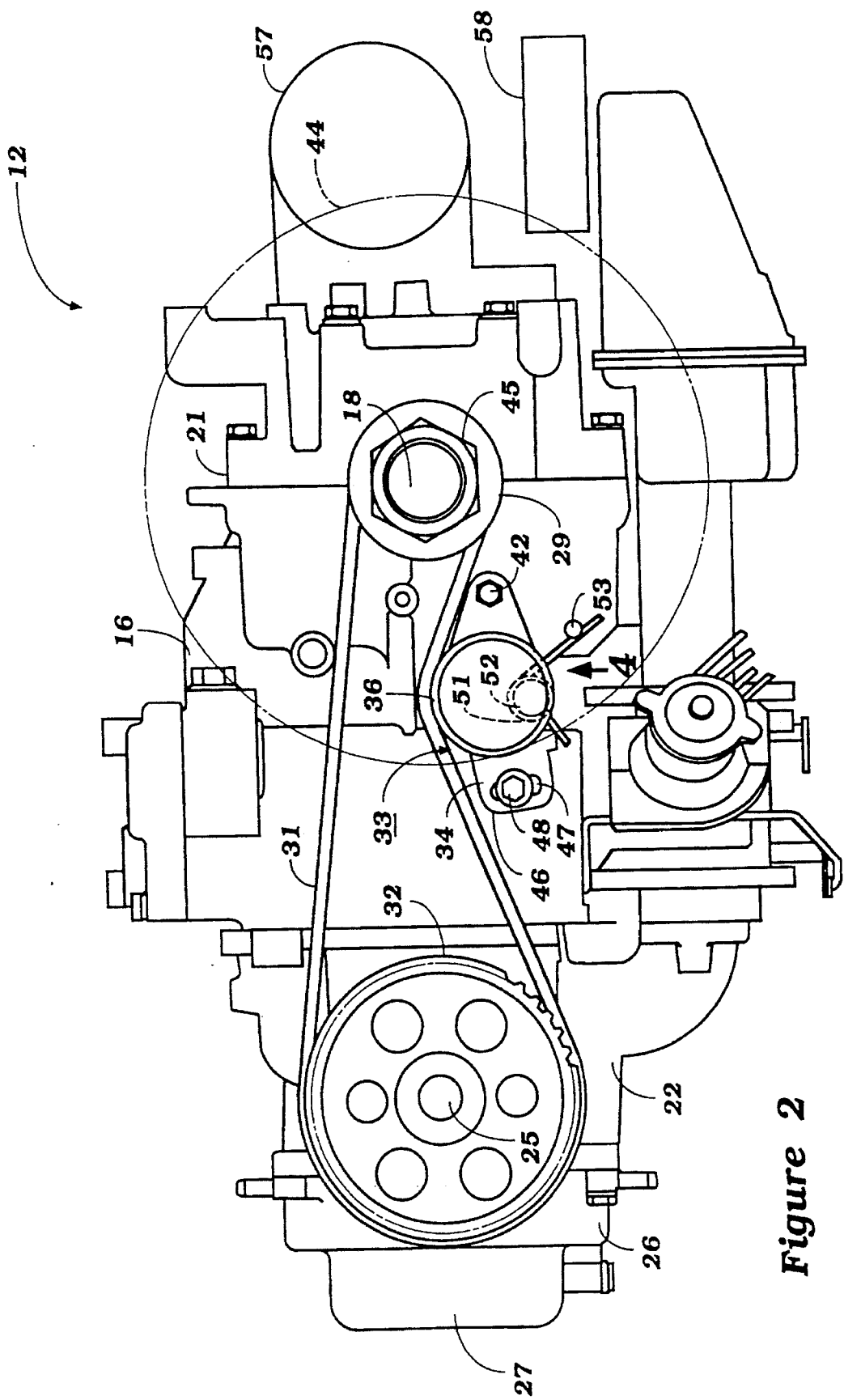
FIG. 2 is an enlarged top plan view of the engine and its driving arrangement with the protective cowling removed and the flywheel shown in phantom.
Figure 3:
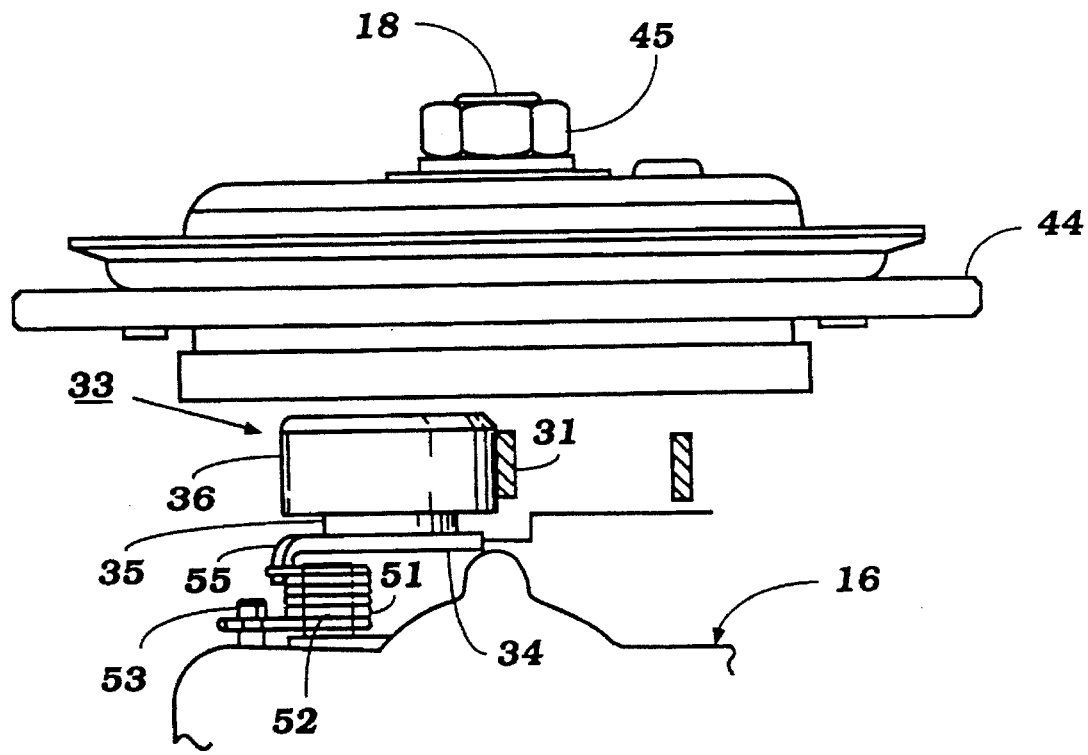
FIG. 3 is a view in part looking in the direction of the arrow 3 in FIG. 1, but showing the idler pulley tensioner mechanism and its engagement with the drive belt in partial section.
Figure 4:
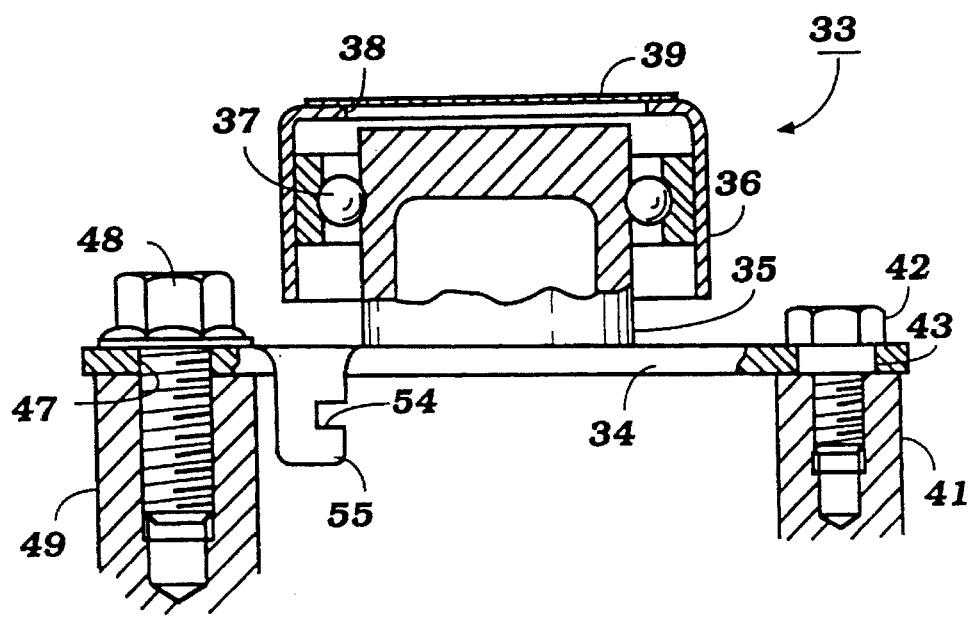
FIG. 4 is an enlarged view looking generally in the direction of the arrow 4 in FIG. 2, but with portions broken away so as to more clearly show the construction.

In accordance with the invention, however, the plate 42 has an outwardly extending arm portion 46 that extends beyond the peripheral edge of the flywheel 44, as clearly shown in FIG. 2. This edge is provided with an arcuate slot 47 which has as its center the center of the pivot bolt 42. A locking bolt 48 extends through the slot 47, and when tightened, will preclude pivotal movement of the plate 34 and movement of the tensioner idler pulley 36.

Figure 5:
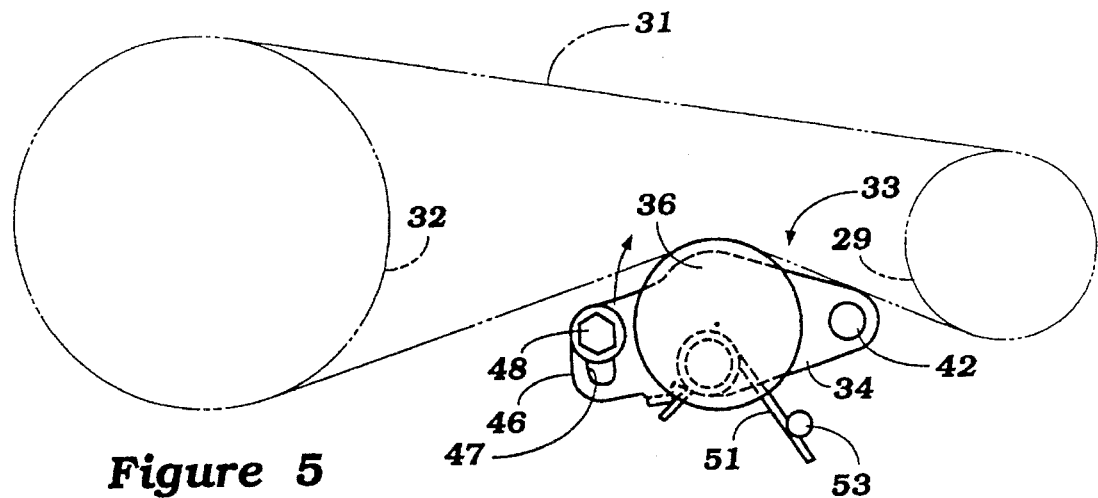
FIGS. 5, 6, and 7 are partially schematic top plan views, in part similar to FIG. 2, and show the condition with the new timing belt installed, and after the timing belt has partially stretched and when fully stretched, respectively.
Figure 7:
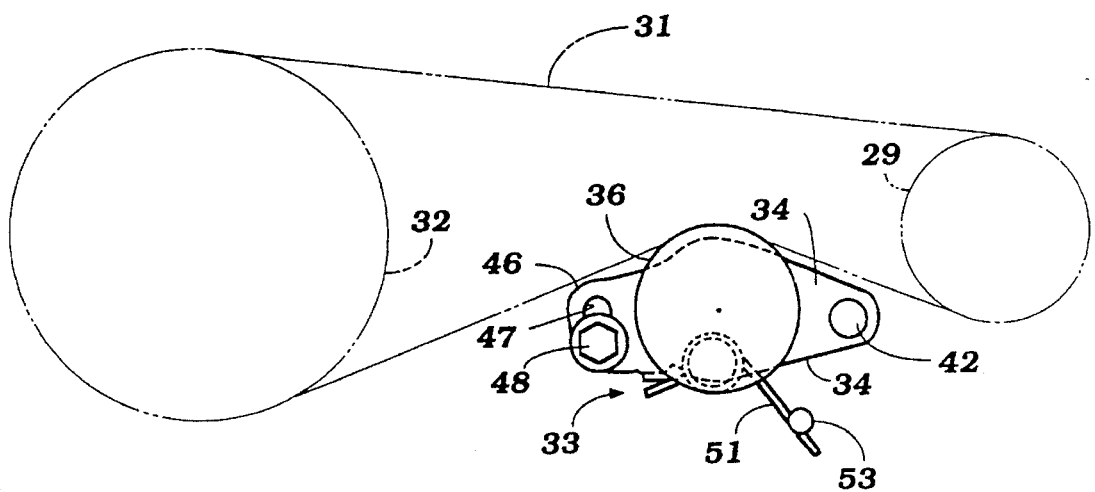

The length of the slot 47 determines the maximum degree of pivotal movement in the tensioning direction from the initial position, as shown in FIG. 5, when a new belt is employed, and the final position, as shown in FIG. 7, when the belt 31 has been elongated to such a point at which it should be removed and replaced rather than being retensioned.

It should be noted that the hold-down bolt 48 is received in a tapped opening formed in a further boss 49 formed on the upper side of the cylinder block 16.

In order to assist in the tensioning of the timing belt 31 and to ensure the proper tension is applied, there is provided a mousetrap-type spring 51 which is wound around a post 52 formed on or affixed to the upper face of the cylinder block 16 and which has one end engaged against a fixed post 53, also affixed thereto. The opposite end of the spring 51 is engaged within a slot 54 of a down-turned tang 55 of the plate 34 so as to bias the plate with a fairly constant force in the clockwise or tensioning direction.

Figure 6:
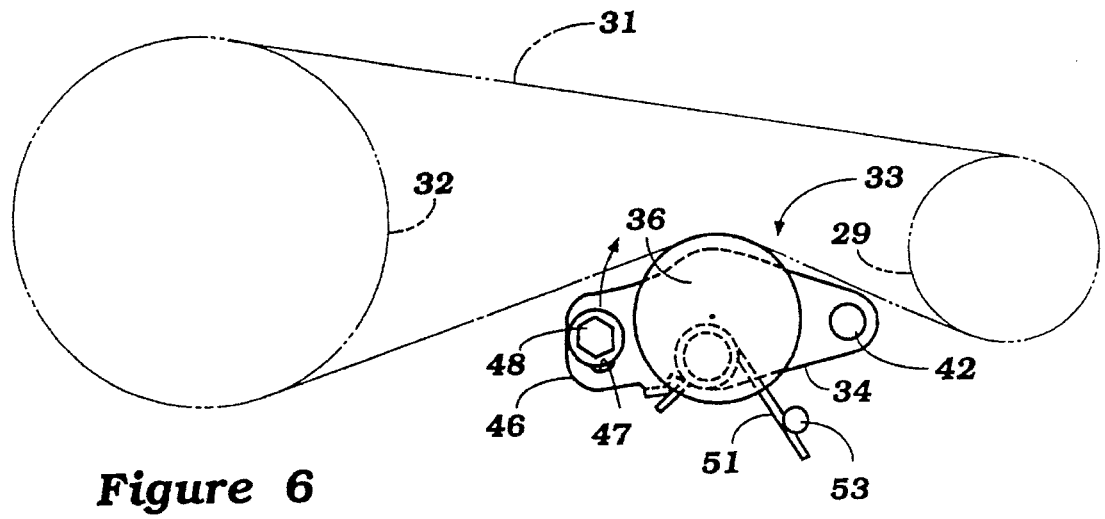

As has been noted, FIG. 5 shows the condition when the new belt has been installed and before it has become worn and elongated. FIG. 6 shows the condition when the belt has been elongated and after the tensioning adjustment has been made. This is made by loosening the bolt 48, which is accessible beyond the periphery of the flywheel 44, as shown in FIG. 2. The spring 51 will then pivot the plate 34 and tensioner pulley 36 so as to move the assembly and retension the belt 31. The bolt 48 is then locked in position. Thus, it is not necessary to measure any torque to properly tension the belt 31 as the spring 51 performs this function.

The flywheel magneto 44 has formed on its outer peripheral edge teeth which are adapted to be engaged by a pinion gear 56 carried at the upper end of a starter motor 57 which is mounted on the crankcase side of the engine in any suitable manner. This starter gear is disposed away from the tensioner mechanism 33.

Adjacent the starter motor 71 is a spark box 58 for a CDI ignition system of the engine.

It should be readily apparent from the foregoing description that the described embodiment of the invention provides a very simple and yet easily accessed tensioner for the flexible drive of a timing camshaft drive for an internal combustion engine. Of course, it is to be understood that the foregoing description is that of the preferred embodiment of the invention, and that various changes and modifications may be made without departing from the spirit and scope of the invention, as defined by the appended claims.

I claim:

1. A tensioner for a flexible transmitter of a camshaft drive for an internal combustion engine having an output shaft rotatable about a first axis, a driving sprocket affixed to said output shaft, a flexible transmitter driven by said driving sprocket affixed to said camshaft and drivingly engaged with said flexible transmitter for driving said driven sprocket and said camshaft, a flywheel affixed for rotation relative to said output shaft and having an outer diameter, a tensioner member mounted for movement relative to said engine in proximity to said first axis for adjusting the tension on said flexible transmitter, said tensioner member being positioned in an area circumscribed by the outer diameter of said flywheel, and means for adjusting the position of said tensioner member disposed radially beyond the outer diameter of said flywheel for adjusting the tension of said flexible transmitter without necessitating removal of said flywheel.

2. A tensioner for the flexible transmitter of a camshaft drive as defined in claim 1, wherein the tensioner member is support for movement upon a pivoted member pivotal about a pivotal axis which pivotal axis lies within the outer diameter periphery of the flywheel and adjacent the first axis.

3. A tensioner for the flexible transmitter of a camshaft drive as defined in claim 2, wherein the pivoted member has a portion extending radially beyond the outer diameter of the flywheel, which portion is adjustably positioned relative to the engine.

4. A tensioner for the flexible transmitter of a camshaft drive as define din claim 3, wherein the portio of the pivoted member beyond the flywheel outer diameter defines an elongated slot and further including a locking fastener passing through said slot for fixing said pivoted member against pivotal movement.

5. A tensioner for the flexible transmitter of a camshaft drive as defined in claim 4, further including biasing spring means for urging said pivoted member in a direction for increasing the tension on the flexible transmitter.

6. A tensioner for the flexible transmitter of a camshaft drive as defined in claim 1, wherein the engine forms the power unit of an outboard motor and the engine output shaft rotates about a vertically extending axis, the driving sprocket being disposed above the upper face of the engine with the flywheel being disposed above the driving sprocket.

7. A tensioner for the flexible transmitter of a camshaft drive as defined in claim 6, wherein the tensioner member is support for movement upon a pivoted member pivotal about a pivotal axis which pivotal axis lies within the outer diameter of the flywheel and adjacent the first axis.

8. A tensioner for the flexible transmitter of a camshaft drive as defined in claim 7, wherein the pivoted member has a portion extending radially beyond the outer diameter of the flywheel, which portion is adjustably positioned relative to the engine.

9. A tensioner for the flexible transmitter of a camshaft drive as defined in claim 8, wherein the portion of the pivoted member beyond the flywheel outer diameter defines an elongated slot and further including a locking fastener passing through said slot for fixing said pivoted member against pivotal movement.

10. A tensioner for the flexible transmitter of a camshaft drive as defined in claim 9, further including biasing spring means for urging said pivoted member in a direction for increasing the tension on the flexible transmitter.

* * * * *